US00RE49752E

(19) United States
(12) Reissued Patent
Markfield

(10) Patent Number: US RE49,752 E
(45) Date of Reissued Patent: Dec. 12, 2023

(54) PET PROTECTIVE COLLAR WITH STAYS

(71) Applicant: Imagine That International, Inc., Santa Monica, CA (US)

(72) Inventor: Linda Markfield, Santa Monica, CA (US)

(73) Assignee: Imagine That International, Inc., Santa Monica, CA (US)

(21) Appl. No.: 15/151,265

(22) Filed: May 10, 2016

Related U.S. Patent Documents

Reissue of:
(64) Patent No.: 8,720,386
Issued: May 13, 2014
Appl. No.: 13/526,516
Filed: Jun. 18, 2012

U.S. Applications:
(60) Provisional application No. 61/498,524, filed on Jun. 17, 2011.

(51) Int. Cl.
*A01K 13/00* (2006.01)
*A01K 27/00* (2006.01)
*A61D 9/00* (2006.01)

(52) U.S. Cl.
CPC ..... *A01K 13/006* (2013.01); *A01K 27/001* (2013.01); *A61D 9/00* (2013.01)

(58) Field of Classification Search
CPC ..... A01K 13/00; A01K 27/00
USPC ..... 119/815, 821, 850, 855, 856
See application file for complete search history.

(56) References Cited

U.S. PATENT DOCUMENTS

| | | | | |
|---|---|---|---|---|
| 3,036,554 | A * | 5/1962 | Johnson | 119/821 |
| 3,696,810 | A * | 10/1972 | Gaylord, Jr. | 602/18 |
| 4,200,057 | A * | 4/1980 | Agar | 424/9.8 |
| 4,385,592 | A * | 5/1983 | Goldstein | 602/18 |
| 4,719,876 | A * | 1/1988 | Wilken | 119/815 |
| 5,012,764 | A * | 5/1991 | Fick et al. | 119/821 |
| 5,133,295 | A | 7/1992 | Lippincott | |
| 5,197,414 | A | 3/1993 | Kanakura | |
| 5,349,927 | A * | 9/1994 | Campbell | 119/815 |
| 5,628,283 | A * | 5/1997 | Huegelmeyer | 119/815 |
| 5,697,328 | A * | 12/1997 | Hunter | 119/714 |
| 5,797,354 | A * | 8/1998 | Marschall | 119/815 |
| 5,915,337 | A * | 6/1999 | Klinkhart et al. | 119/815 |
| 6,532,904 | B1 * | 3/2003 | Bowen | 119/865 |
| 6,659,046 | B2 * | 12/2003 | Schmid et al. | 119/815 |
| 7,743,736 | B2 * | 6/2010 | Winestock | 119/815 |
| 7,765,957 | B2 * | 8/2010 | Behravesh et al. | 119/815 |
| D632,851 | S * | 2/2011 | Maroney et al. | D30/152 |
| D647,669 | S * | 10/2011 | Martinez | D30/152 |
| 8,042,494 | B2 * | 10/2011 | Markfield | 119/855 |
| 8,181,609 | B2 * | 5/2012 | Ohashi | 119/815 |
| D664,721 | S * | 7/2012 | Martinez | D30/152 |
| 2007/0181080 | A1 * | 8/2007 | Gibson | 119/815 |

(Continued)

FOREIGN PATENT DOCUMENTS

GB 1015649.5 3/2011

OTHER PUBLICATIONS

Golden Retriever News, vol. LXII, No. 4, Jul.-Aug. 2005, USPS 964-620, p. 61.

*Primary Examiner* — My Trang Ton
(74) *Attorney, Agent, or Firm* — Michael D. Eisenberg

(57) ABSTRACT

A flexible pet protective collar having stays formed of a more rigid material than flexible sheets of the collar, the stays being disposed inside channels located at seams of the collar.

30 Claims, 12 Drawing Sheets

(56) References Cited

U.S. PATENT DOCUMENTS

| | | | | |
|---|---|---|---|---|
| 2007/0199521 | A1* | 8/2007 | Winestock | 119/855 |
| 2009/0000569 | A1* | 1/2009 | Behravesh et al. | 119/815 |
| 2009/0056642 | A1 | 3/2009 | Markfield | |
| 2009/0241855 | A1* | 10/2009 | Stocki | A01K 13/006 119/815 |
| 2011/0277701 | A1* | 11/2011 | King | A61D 9/00 119/815 |
| 2013/0055968 | A1* | 3/2013 | Lippincott | A01K 13/006 119/821 |
| 2015/0053147 | A1 | 2/2015 | Lippincott | |

* cited by examiner

AMENDED

AMENDED

Detail A

AMENDED

PET PROTECTIVE COLLAR WITH STAYS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

The present application *is a reissue application of U.S. Pat. No. 8,720,386, granted May 13, 2014, which* claims priority from U.S. provisional application Ser. No. 61/498,524 filed Jun. 17, 2011 which is hereby incorporated herein by reference in its entirety.

TECHNICAL FIELD

The present invention, in some embodiments thereof, relates to a pet protective collar, and in particular, some embodiments relate to a flexible e-collar with stays.

BACKGROUND OF THE INVENTION

When wounded or when a diseased site is present, many animals, for example cats and dogs will instinctively lick or bite at the site of the injury or disease. Repeated licking typically results in slower healing and increased risk of infection. Where animals have undergone a surgical procedure, licking further risks disruption of sutures placed to keep the surgical wound closed while the healing process proceeds. Disruption of a surgical wound is highly undesirable as it subjects the animal to the risk of serious or even fatal internal infections. In any case where a medication is applied, the animal tends to lick it.

As a result, a variety of approaches have been developed to prevent animals from licking or otherwise disturbing wounds or a diseased or injured area while they are healing. For example, one common approach is to use a protective collar known as an "Elizabethan collar" or "E-collar" as they are sometimes called. These collars usually are formed from flexible but relatively rigid materials such as sheets of plastic or cardboard, and are provided in a range of sizes in order to accommodate animals of different size. The E-collar is wrapped around the animal's neck and then secured in place as a means by which to prevent the animal from contacting or otherwise disturbing a wound or site of application of a topical medicament.

One example is provided by U.S. Pat. No. 4,200,057 (Agar), which discloses a method of using a cone-shaped collar made of a semi-rigid material that when secured forms a cone around the animal's neck and which prevents the animal from contacting a region on the animal to which a substance has been applied topically. However, while commonly used, traditional E-collars suffer from a number of limitations that detract from their usefulness.

For example, as discussed above, these collars are usually fashioned from relatively rigid materials. Consequently they are not adapted to folding and take up significant space when on a store shelf, or when stored by an animal owner after purchase and between uses. In addition, the rigid material tends to be uncomfortable for the animal to wear and it can break if bent too far. Further, the rigid material can shatter when subjected to cold temperatures. The rigid materials typically used in E-collars also make it difficult for the animal to eat or drink or get through tight spaces, and the pet is jarred if it bumps into something straight-on. The rigid E-collars can scratch furniture, knock things over and hurt a person. Also, the noise of striking something or even brushing against something can cause stress for the pet.

It is well known in the art that animals dislike the application of the E-collar and will attempt to remove it. This results in increased stress to the animal, and if removed, obviates the utility of the collar to prevent contact of an injured area by the animal, prolonging healing time and increasing the risk of serious infection.

A variety of protective collars have been described, some based on the traditional E-collar design, and others using other designs. For example, U.S. Pat. No. 5,012,764 (Fick & Fair) discloses a cone-shaped E-collar with a custom fittable closure. The device improves upon the traditional collar in that it provides a "one-size fits all" capability. However, the Fick device still suffers from design limitations in that it is a rigid collar that animals dislike.

U.S. Pat. No. 5,469,814 (Moy & Moy) discloses a protective collar that avoids the cone-shape of the traditional E-collar. In the Moy device, the collar comprises a sheet of flexible material sized to cover the entire neck from the back of the mandible to the scapula. Thus, the movement of the neck is restricted such that the animal is prevented from licking or biting at wounds. However, the device is not useful in protecting irritation of injuries to the head as the close fitting design does not prevent pawing of an injury of the head or face.

Similarly, U.S. Pat. No. 4,476,814 (Miller) discloses a donut shaped collar that is wide enough to prevent an animal from turning its head sufficiently in order to lick or chew at an affected area.

Likewise, U.S. Pat. No. 6,244,222 (Bowen) discloses a foam sleeve that like that disclosed in U.S. Pat. No. 5,469,814 covers a region of the animal's neck thereby preventing the animal from bending the neck in order to contact an affected area.

As discussed, the aforementioned E-collars are generally formed from rigid materials, such as plastic, that are uncomfortable and thus not well tolerated by animals. To overcome this problem, some collars have been disclosed that are formed from softer more compliant materials. For example, U.S. Pat. No. 5,133,295 (issued to Lippincott) discloses a collar that comprises two side-by-side rings of soft material, with non-resilient medical padding sewn together along their inner margins. The rings are gathered to form radial pleats that interfere with the ability of the animal to chew or lick affected body parts. However, as the collar could conceivably be bent backwards from the head, it would be possible for an animal to paw at injuries in the head area, again limiting the overall usefulness of this type of collar. Also, a soft e-collar can be easily chewed by the pet due to the inside material being loose.

BRIEF SUMMARY OF EMBODIMENTS OF THE INVENTION (1) In a variant, a protective collar that is effective as a veterinary restraint when fitted on an animal, comprises a layered assembly comprising: a first sheet comprising a flexible substantially non-resilient material having inner and outer arcuate edges extending between a first end and a second end of the first sheet, the inner and outer arcuate edges comprising single circular arcs, wherein the outer arcuate edge has a substantially greater radius than the inner edge; a second sheet comprising a flexible substantially non-resilient material and having a substantially similar shape to that of the first sheet; a flexible resilient padding layer, forming a generally similar shape to the first and second sheets located between said first and second sheets, such that when assembled the first and second sheets and the padding layer form the layered assembly having an outer arcuate edge and an inner arcuate edge and a first end and a second end. At least one stay is connected to one of the sheets, for preventing the sheet from folding, and the stay is effective to stiffen the overall shape of the collar. The first sheet and the second sheet and the padding layer between them are formed into the assembly by securing together the outer arcuate edges and the inner arcuate edges and the first and second ends of the first and second sheets. A closure is effective to secure the first and second ends of the protective collar, such that when the first and second ends of the protective collar are secured, a closed configuration is formed having an inner opening and an outer opening. The inner opening being substantially smaller than the outer opening. The outer opening is configured to encompass the wearer's head and the inner opening is configured to encompass a wearer's neck but not the head. The protective collar is sized and shaped to encompass both the wearer's head and neck on different parts of the restraint.

(2) In another variant, the protective collar further comprises: a plurality of radial stitching lines at least partially extending between the inner arcuate edge and the outer arcuate edge of the layered assembly, operative to effectively segment the collar into panels, and such that the stitches are further effective as fold lines in order to easily fold the collar for packaging or storage. At least one channel is disposed along a radial stitching line, and is configured to receive the stay.

(3) In a further variant of the protective collar, a plurality of channels contain a stay. The channels at least partially extend between the inner arcuate edge and the outer arcuate edge of the layered assembly.

(4) In yet another variant of the protective collar, the channels further comprise an opening disposed along the smaller circumference side of the collar.

(5) In still further variant of the protective collar, the channel openings to the channels having a closure mechanism for preventing the unintentional release of the stays.

(6) In a variant of the protective collar, the channel openings to the channels having a closure mechanism disposed inside the channel near the opening and completely across the opening.

(7) In another variant of the protective collar, disposed in front of the opening is a optional piece of loop material for partially occluding the opening to assist in preventing unwanted escape of the stay during use of the collar.

(8) In a further variant of the protective collar, the channels are formed on an outside surface of a sheet.

(9) In yet another variant of the protective collar, the channels are formed between the first and second sheet.

(10) In still a further variant, a protective collar that is effective as a veterinary restraint when fitted on an animal comprises: a flexible assembly having an outer arcuate edge and an inner arcuate edge and a first end and a second end; and at least one stay connected to the assembly and extending in a direction between the inner and outer arcuate edges, the stay formed of a material stiffer than that of the flexible assembly.

(11) In a variant, the protective collar comprises: a plurality of radial stitching lines at least partially extending between the inner arcuate edge and the outer arcuate edge of the assembly, operative to effectively segment the collar into panels, and such that the stitches are further effective as fold lines in order to easily fold the collar for packaging or storage; and at least one channel disposed along a radial stitching line, the channel being configured to house the stay.

(12) In another variant of the protective collar, a plurality of channels each contain a stay. The channels at least partially extend between the inner arcuate edge and the outer arcuate edge of the assembly.

(13) In a further variant of the protective collar, the channels further comprise an opening disposed along the smaller circumference side of the collar.

(14) In yet another variant of the protective collar, the channel openings to the channels have a closure mechanism.

(15) In still a further variant of the protective collar, the channel openings to the channels having a closure mechanism disposed inside the channel near the opening and completely across the opening.

(16) In a variant of the protective collar, disposed in front of the opening is a optional piece of loop material for partially occluding the opening to assist in preventing unwanted escape of the stay during use of the collar.

(17) In another variant of the protective collar, the channels are formed on an outside surface of a sheet.

(18) In a further variant of the protective collar, the channels are formed between the first and second sheet.

(19) In still another variant, a protective collar that is effective as a veterinary restraint when fitted on an animal comprises a layered assembly comprising: a first sheet comprising a flexible substantially non-resilient material having inner and outer arcuate edges extending between a first and second end of the first sheet, the inner and outer arcuate edges comprising circular arcs, wherein the outer arcuate edge has a substantially greater radius than the inner edge; a second sheet comprising a flexible substantially non-resilient material and having a substantially similar shape to that of the first sheet. When assembled, the first and second sheets form the layered assembly having an outer arcuate edge and an inner arcuate edge and a first end and a second end. At least one stay is connected to the assembly and extending in a direction between the inner and outer arcuate edges. The stay is formed of a material stiffer than that of the flexible assembly. The first sheet and the second sheet are formed into the assembly by securing together the outer arcuate edges and the inner arcuate edges and the first and second ends of the first and second sheets. A closure is effective to secure the first and second ends of the protective collar, such that when the first and second ends of the protective collar are secured a closed configuration is formed having an inner opening and an outer opening, the inner opening being smaller than the outer opening to provide a truncated cone shape.

(20) In a variant, the protective collar has a plurality of channels that each contain a stay. The channels at least partially extend between the inner arcuate edge and the outer arcuate edge of the assembly.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
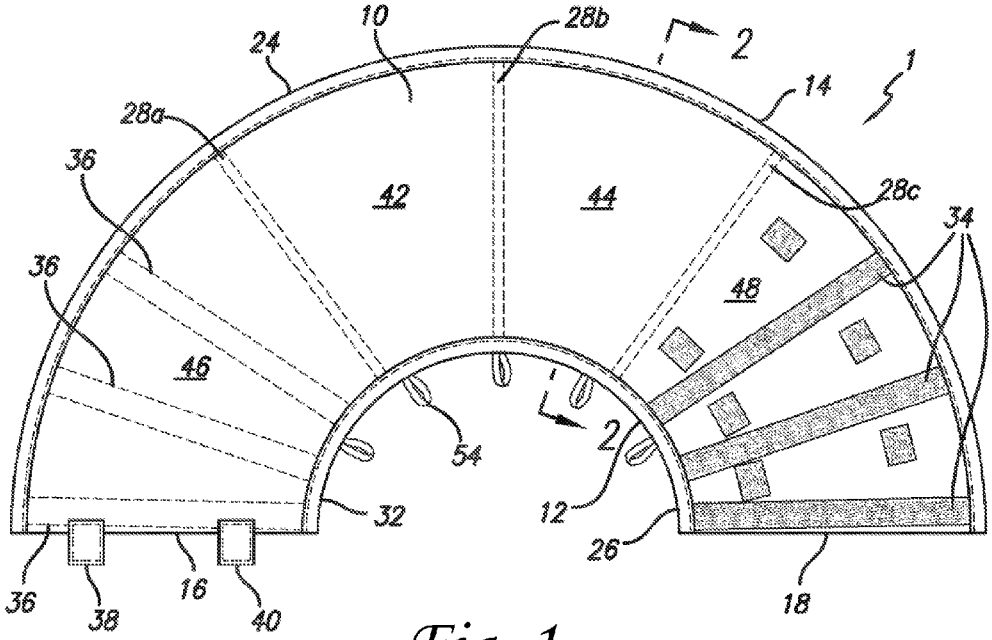
FIG. 1 is a top view of an embodiment of the protective collar in the unfolded configuration.
Figure 2:
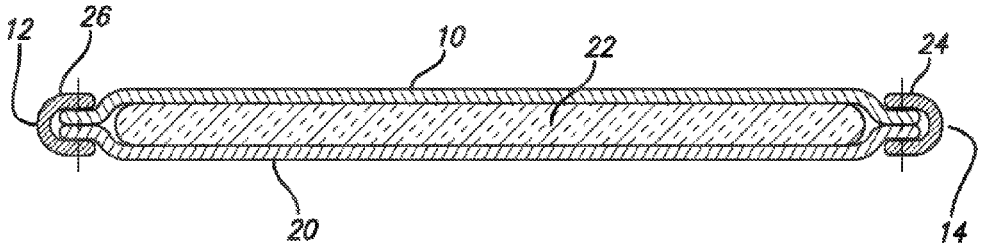
FIG. 2 is a section view of the protective collar of FIG. 1 through 2-2 of FIG. 1, depicting the arrangement of first and second exterior sheets and a padding layer and the stitching along each of the arcuate edges.
Figure 3:
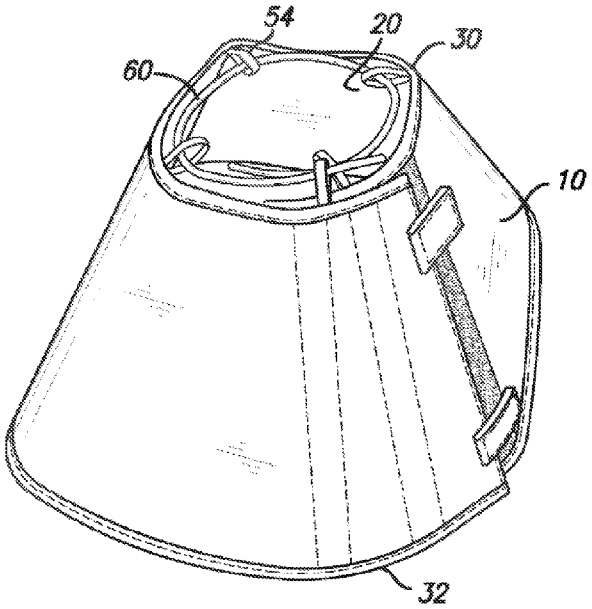
FIG. 3 is a perspective view of the protective collar of FIG. 1, as it would appear when fitted on an animal.

Referring first to FIGS. 1, 2 and 3, the present invention provides a protective collar 1 effective as a veterinary restraint when fitted on an animal. In this embodiment of the invention the protective collar 1 comprises a first exterior sheet 10 comprising a flexible material having inner and outer arcuate edges 12 and 14 respectively, the edges being generally concentric around a common center and extending between a first end 16 and a second end 18. A second exterior sheet 20 (underneath sheet 10 in FIG. 1) also comprises a flexible material. The second exterior sheet 20 is substantially the same size and shape to enable creating the two sides of the collar with a space for a resilient padding layer 22 as shown in FIG. 2.

The resilient padding layer 22, also of a generally similar shape to the first and second exterior sheets 10 and 20, and is sized to be located between the first and second exterior sheets 10 and 20 as shown in FIG. 2. When assembled, the first and second exterior sheets 10 and 20 and the resilient padding layer 30 form a substantially at least semi-circular shape, as has been shown in FIG. 1. Actually, in order to allow a lot of size adjustability, it is somewhat greater than semicircular.

The first and second exterior sheets 10 and 20 can be fashioned from a variety of materials including cloth, rubberized cloth, soft plastic and the like. Apart from the physical quality to provide a soft, flexible surface of the finished assembly, the first and second exterior sheets and the resilient padding between then, when formed into the in-use cone shape needs only to be sufficiently rigid and resilient to be self-supporting. The present invention uses materials that are soft and flexible and specifically avoids the use of rigid plastic sheet materials as is commonly found in traditional E-collars. In one particular, it may be desirable to select a soft-surfaced comfortable material for the inside of the collar adjacent to the animals head and neck, and a more rugged material for the outside of the collar. Also, the outside of the collar may be provided in a decorative motif, and may be made of material that is easily cleaned and/or that is resistant to staining.

The padding layer 22 may also be fashioned from a variety of materials. The material used in the padding layer 22 should be flexible enough to provide a collar that is softer and therefore more comfortable than traditional e-collar, yet is rigid enough to maintain the desired cone-like shape of the collar when worn by an animal and sufficiently resilient to return to its cone shape when bent. It is preferred that the first and second exterior sheets 10 and 20 be quite flexible with little resilience and resistance to bending, while the padding layer 22 be more resilient such that when they are formed into a unit and applied to an animal in a cone shape it will be sufficiently rigid to maintain its cone configuration yet will easily give when hit or pushed or bent and resilient enough to recover its cone shape. Foam plastic is a good material for use as the padding layer, and a wide range of resiliency, and thickness is available.

In the embodiment of FIGS. 1, 2 and 3 the padding layer 22 comprises a layer of foam sandwiched between the first and second exterior sheets 10 and 20, as shown in FIG. 2. Other materials such as non-woven sheets or like materials may be used to provide a soft sufficiently resilient and rigid padding layer. The first exterior sheet 10 and the second exterior sheet 20 are joined along their peripheries 12 and 14 by sewing.

In the embodiment shown in FIGS. 1, 2 and 3, using separate exterior sheets 10 and 20, they are sewn together along the inner arcuate edge 12 and the outer arcuate edge 14 using conventional hem sewing techniques, using outer hem strips 24 and 26 as shown in FIG. 2, with the padding layer 30 inside. The padding layer 22 may be sewn-in along the inner arcuate edge or the outer arcuate edge, or just retained in the space, the latter being shown in FIG. 2. The outer hem strip 24 (and also hem strip 26) can be made with a reflective surface or a glow-in-the-dark surface for safety and otherwise to easily spot the pet.

Stitching can be used to further strengthen the collar while still allowing it to easily bend on contact and also to provide folding points. Radially extending stitching 28a, 28b and 28c comprising two parallel rows, provides some additional rigidity radially and also provides convenient folding points upon which the collar can be folded for storage or packaging, and further strengthen the integrity of the collar when in use. The preferred stitching is zigzag type or parallel rows of straight stitching that is of a selected width dimension such as about ⅛ inch to about ¼ inch and they extend substantially fully across the width from the arcuate edge 14 to the arcuate edge 12. Examples of collars folded for storage or packaging are shown in FIGS. 6-9d and are described below. It can be appreciated that the radial stitching lines are placed so that the collar will fold into at least approximately equal segments such that stitch 28a is about at the center of the collar and stitches 28b and 28c are about halfway to the beginning of the closure elements. That will allow it to be optimally folded for packaging or storage.

Figure 10:
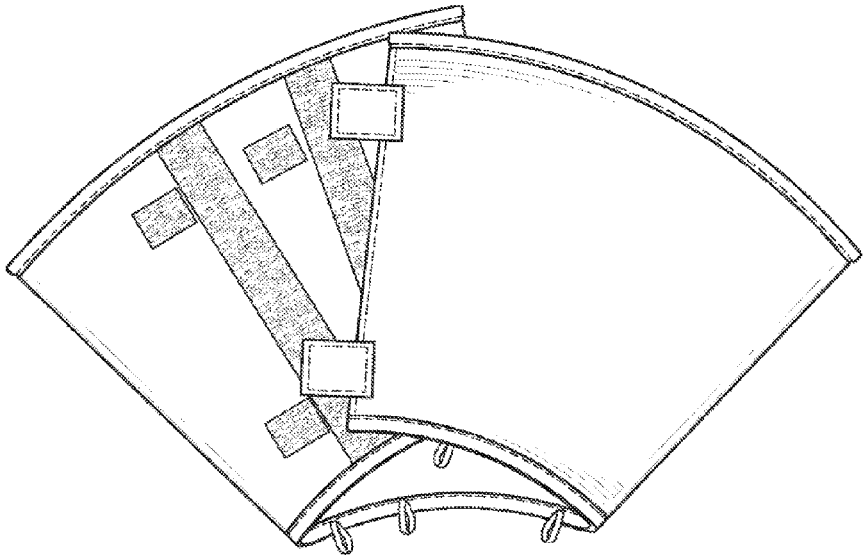
FIG. 10 shows the protective collar such as in FIG. 1 with its ends attached by use of hook and loop fasteners being mated in a skewed orientation to provide a selected fit.
Figure 11:
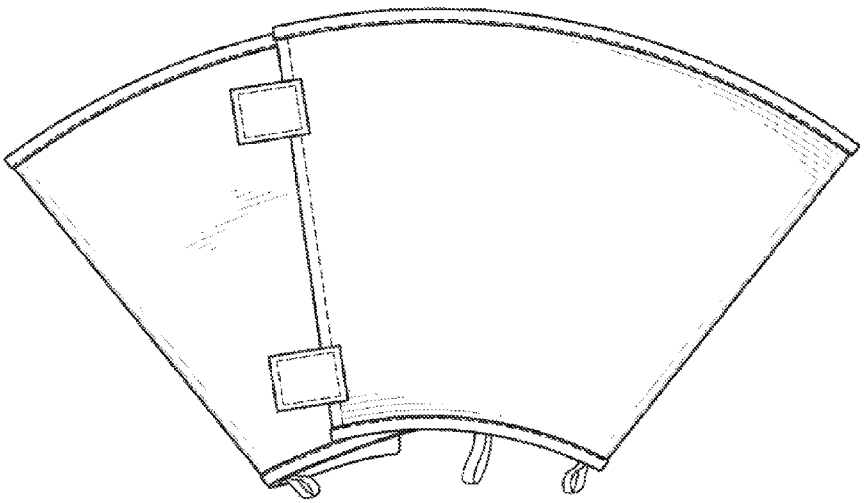
FIG. 11 shows the protective collar such as in FIG. 1 with its end attached in which the mating strips of hook and loop fasteners are aligned.

The invention further comprises a means of closure, effective to secure the ends of the protective collar, such that when the ends of the protective collar are secured, the collar forms a truncated cone with an inner opening 30 and an outer opening 32 as shown in FIG. 3. Various means of closure are suitable for use in the invention. In one embodiment hook and loop fastener strips such as Velcro products conveniently secure the ends of the collar to form the desired cone shape as shown in FIG. 3. In the embodiment shown in FIGS. 1, 2 and 3, a plurality of first hook and loop strips 34 are on the exterior sheet 10 (facing up in FIG. 1), in the example, three strips 34 and three sets of tabs 38 and mating plurality of three second hook and loop strips 36 are on the exterior sheet 20 (facing down in FIG. 1). Also, downward facing tabs 40 are sewn onto the end 16 being fastenable to any pair of the tabs 38, or any of the strips 34. As shown in FIG. 1 each end of the protective collar has three strips of fastener material 34 and 36 respectively. This allows the device to be sized appropriately to the animal by allowing a variety of engagement positions for greater or lesser opening neck fitting. Also, with the use of the tabs 40, in addition to providing options for sizing, the edge 16 can be kept from protruding. As few as one strip on one side and two strips on the other side will allow for minimal size adjustability. Using the multiple closure position features, such as the plurality of hook and loop strips a fitted closure can be selected for mating alignment and matching of the outer and inner edges such as shown in FIG. 11. This can be referred to as normal or edge aligned fitting. Also, the plurality of strips and tabs allow for non-edge matched closure, such that for example, the strips may be crossed with respect to each other to be not evenly aligned, so that the shape of the cone can be adjusted, for example, to be narrower at the outside, or wider at the outside or similarly at the inside, such as shown in FIG. 10. This can be referred to as distortion fitting or personalized fitting. The user can conform the shape as desired to conform to the pet's head and neck shape and size. In yet another embodiment snaps are used to secure the ends of the collar.

To maintain the integrity of the collar, the invention provides for a means of securing the first and second exterior sheets to the resilient padding layer. In one embodiment the means of securing the first and second sheets and padding layers comprises laminating or otherwise adhering the padding layer onto at least one of the exterior sheets of flexible material. In another embodiment, the padding layer is laminated or adhered onto both the first and second exterior sheets. Securing the padding layer to the sheets further prevents the animal from separating the layers of the collar and either reducing the effectiveness of the collar or destroying it altogether. In a preferred embodiment the padding layer is laminated or adhered only to the exterior sheet that will be on the inside of the cone, when formed around the animal's head.

Figure 4:
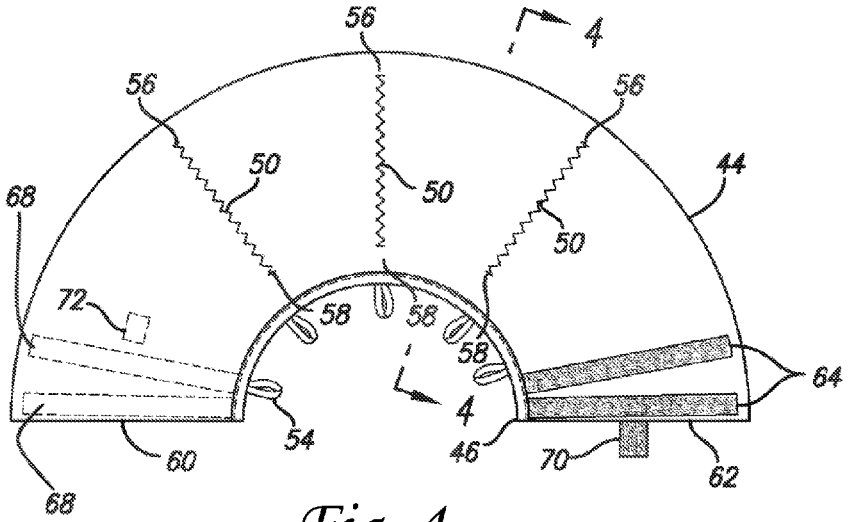
FIG. 4 is a top view of another embodiment of the protective collar in the unfolded configuration.
Figure 5:
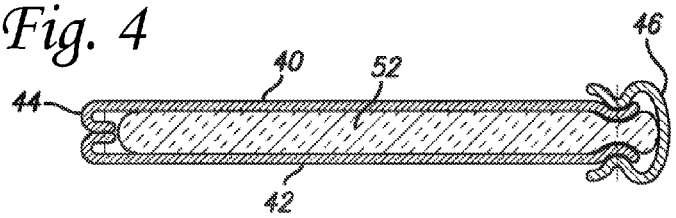
FIG. 5 is a section view of the protective collar of FIG. 2 through 4-4 of FIG. 3, depicting the arrangement of first and second exterior sheets and a padding layer and the stitching along each of the arcuate edges.

Another construction of the protective collar is shown in FIGS. 4 and 5. It is similar generally to the form in FIGS. 1, 2, and 3, but is suitable for smaller sizes, and softer material. In this form a first exterior sheet 40 and a second exterior sheet 42 are sewn together at the outer arcuate edge 44 with a blind hem stitch while the inner arcuate edge 46 has a regular hem stitch with a hem strip 48. Radial stitching 50 does not extend to the outer arcuate edge 44 or to the inner arcuate edge 46 but rather stops short of them leaving a space 56 adjacent the outer arcuate edge 44. There can also be a space 58 adjacent the inner arcuate edge 46. Ends 60 and 62 have near them fasteners such as strips of mating hook and loop fasteners 64 and 68. Also a tab 70 can fasten either to one of the strips 68 or to a patch 72. This construction is preferred for smaller sized protective collars in which a very light weight combination of materials is used such as for cats or kittens For example, the exterior sheets may be sheets of thin or cloth reinforced plastic sheet and the spaces 56 and 58 allow for easy bending. An inner padding 52 can be foam or other material as described above; and it may be adhered to the first exterior sheet or the second exterior sheet or both; preferable at least to the exterior sheet that will form the inside of the cone proximate the animal that is wearing it. This construction is preferred for smaller pets such as kittens. It is more easily flexed so as to make eating easier for the pet.

Conveniently, a number of neck closure means may be provided in order to provide the ability to fashion a protective collar capable of fitting different size animals. As shown in FIGS. 1, 3 and 4, a series of loops 54 are sewn into the hem. These can be made of elastic material so as to stretch to accept the pet's normal collar. Alternatively, a string 62 or other elongated member can be applied through the loops and pulled comfortably around the animal's neck to keep the unit in place. In another embodiment, a drawstring sewn into the inner edge might also be useful to further secure the collar on the animal.

When placed on an animal, the inner opening 30 is adapted to fit securely around the neck of the animal, and the outer opening 32 is of sufficient size to prevent the animal fitted with the protective collar from contacting an area of the body to be protected. If desired, the inner arcuate edge of the collar may be lined with a softer material to increase the comfort of the collar.

Figure 12:
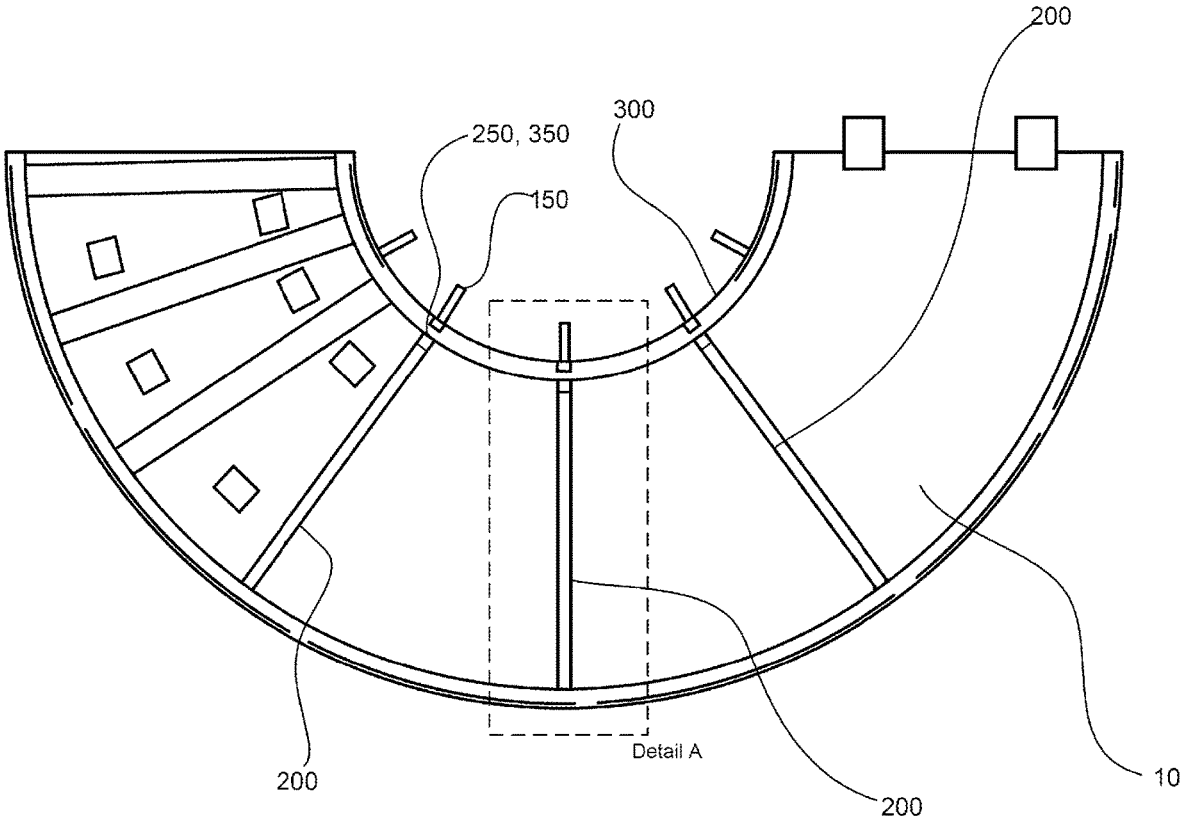
FIG. 12 is an illustration of a top view of a pet protective collar with stays disposed at the seams.
Figure 13:
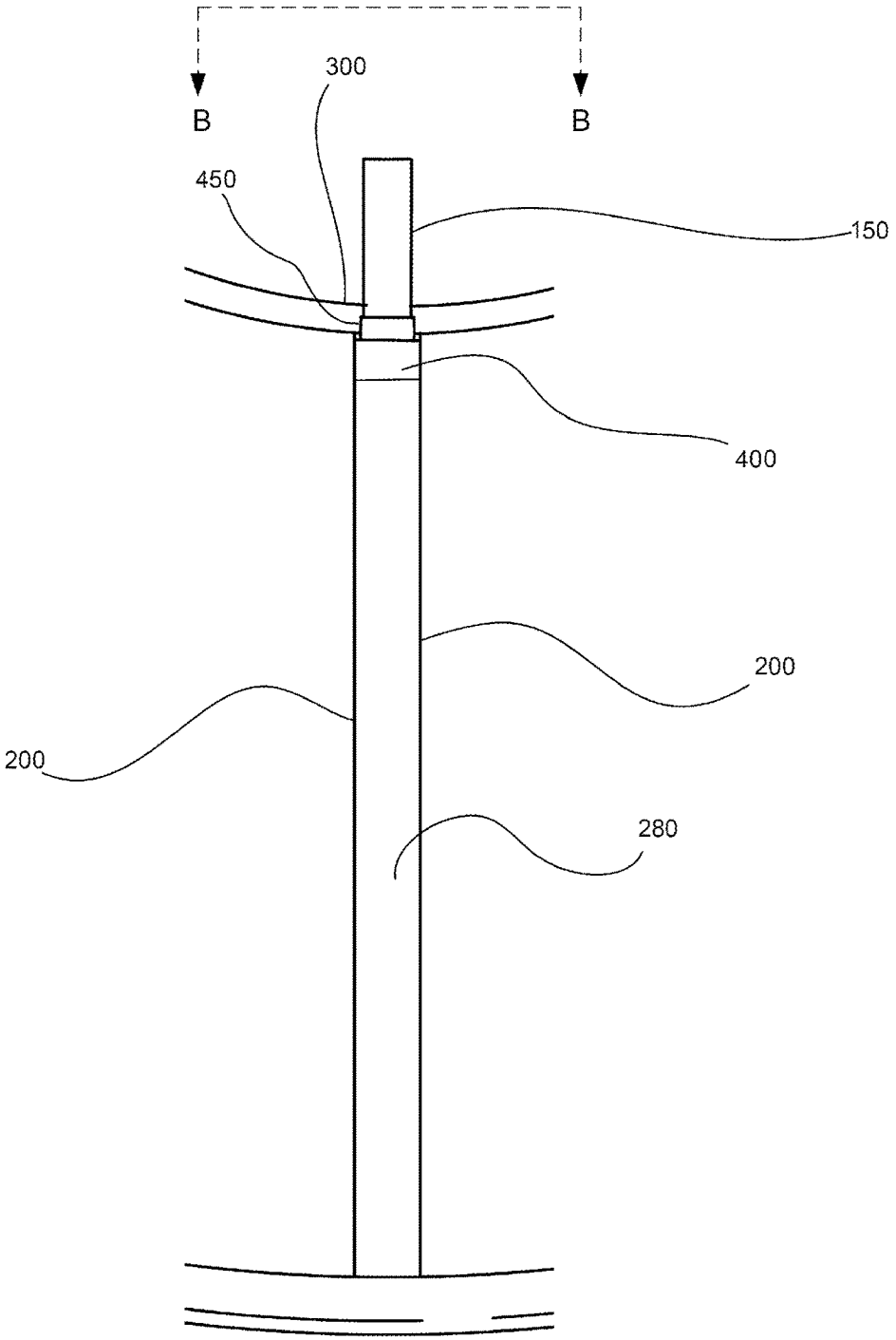
FIG. 13 is a detail view of a seam containing a stay.
Figure 14:
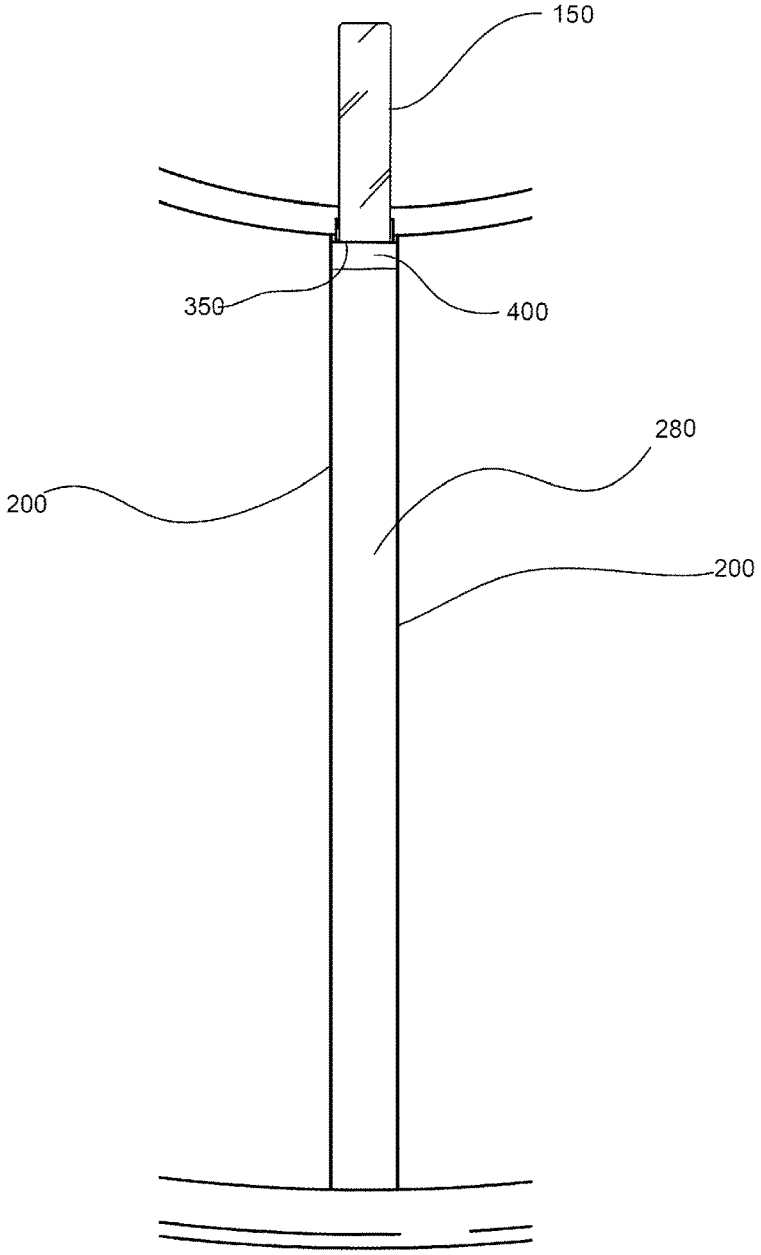
FIG. 14 is a detail view of the pet protective collar with stays disposed at the seams, with a stay partially removed from the channel.
Figure 15:
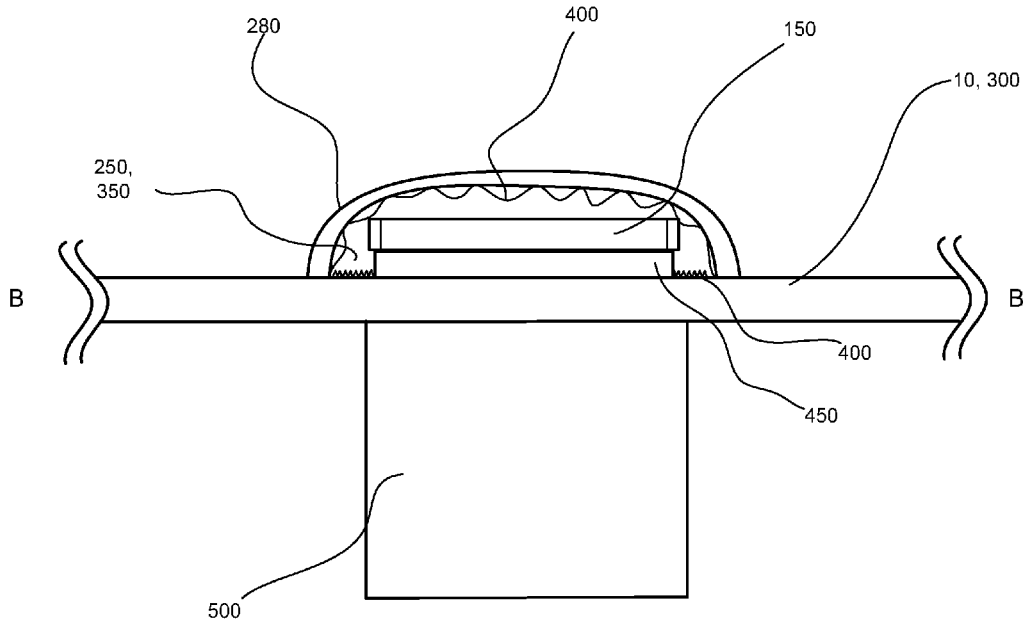
FIG. 15 is a view along the line B-B of FIG. 14 illustrating the opening to the channel in an open position with a stay in place.
Figure 16:
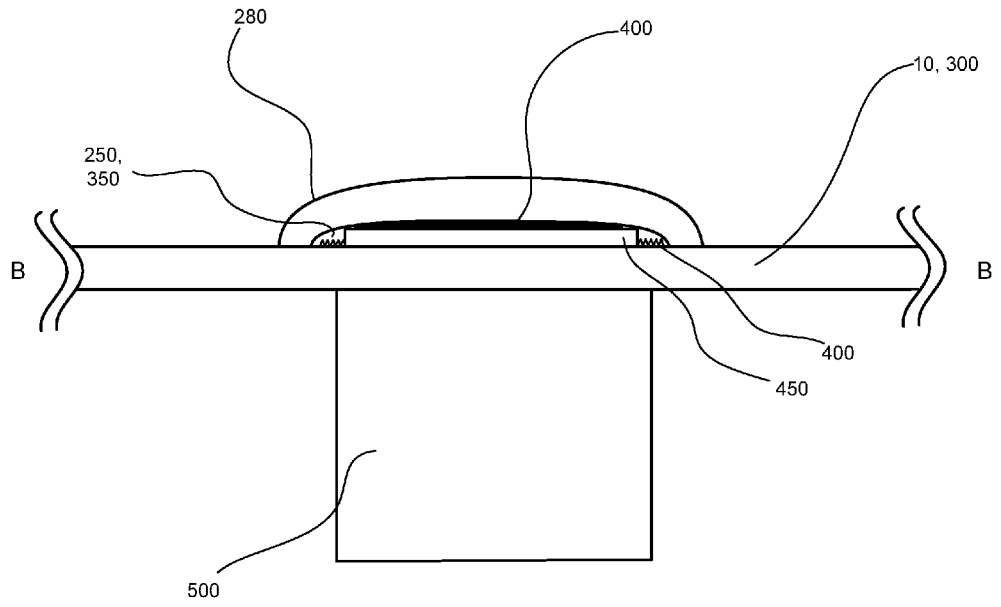
FIG. 16 is a view along the line B-B of FIG. 14 illustrating the opening to the channel in a closed position.

Referring to FIG. 12, with the construction as described above, providing a bendable and resilient construction, sufficient to be self supporting, the protective collar can be folded outwardly along its outer margin to provide a cuff 70. This will allow more freedom of movement for the pet's head giving the protective collar more variety of configurations for a wide range of pet sizes.

Notably, these constructions for a protective collar do not have to slip over the head of the pet, but rather can close around the neck.

The exterior sheet or sheets such as sheets 10 and 20 in FIG. 1 can be made as spaces for advertising or personal messages by owners. Also the collar strip strung into the loops 54 can carry advertising or other types of messages. Such messages can relate to beneficial or charitable content or they can be commercial. The collar strip can be reserved with an area in which the owner can implement her own message The invention further provides a method of using a pet protective collar as described above as a veterinary restraint. The method comprises placing a collar such as that described herein around the neck of an animal, and securing as described. Conveniently, the collar of the invention is suitable to protect an area from contact by the animal's mouth, and yet is comfortable enough to wear that the animal will tolerate the collar.

Figure 6:
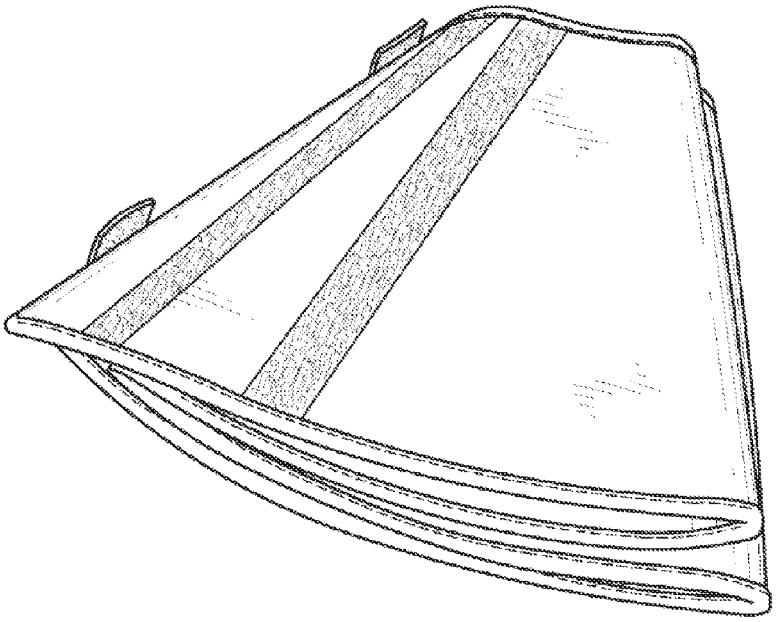
FIG. 6 is a folded view of the protective collar of FIG. 1.
Figure 7:
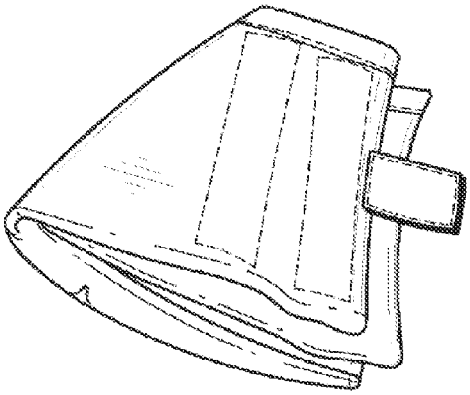
FIG. 7 is a folded view of the protective collar of FIG. 3.
Figure 8A:
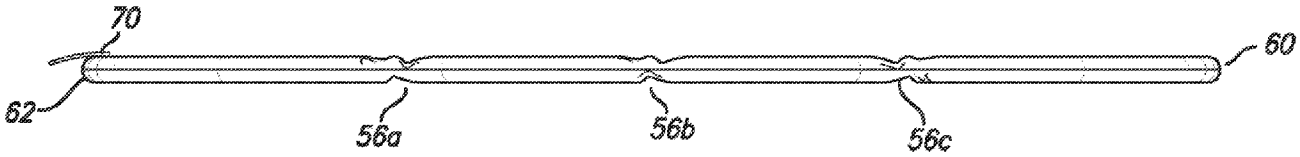
FIGS. 8A-8D show folding steps for folding a protective collar into the form as shown in FIG. 7.
Figure 8C:
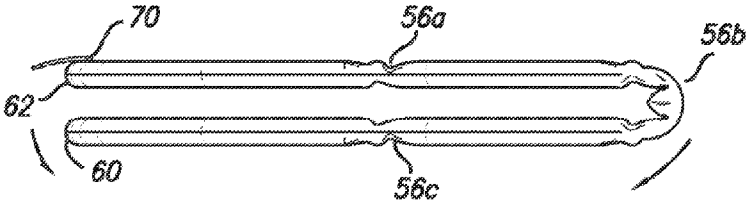
Figure 8D:
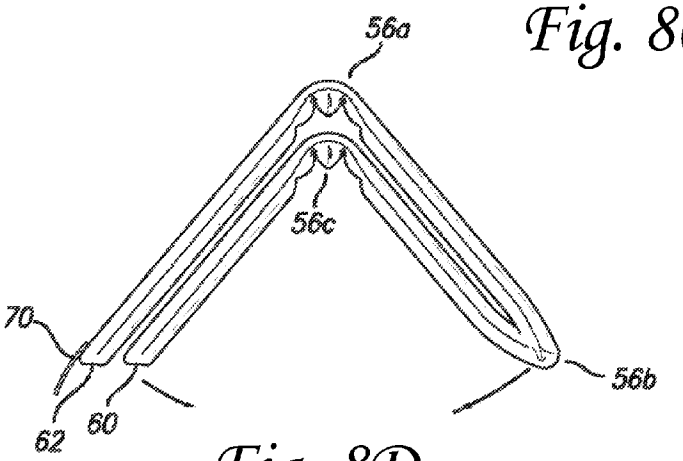
Figure 8B:
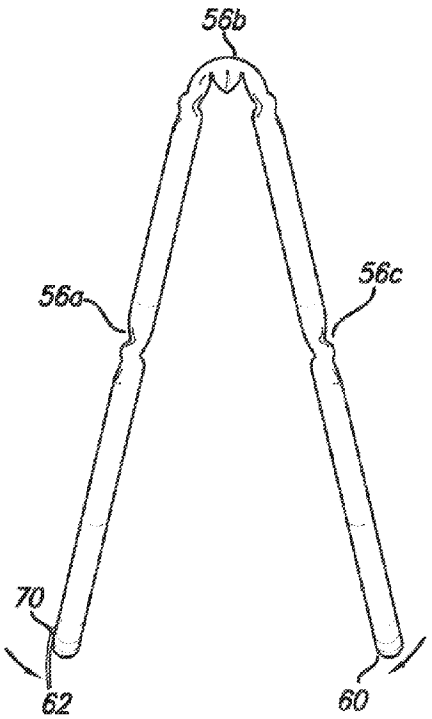
Figure 9A:
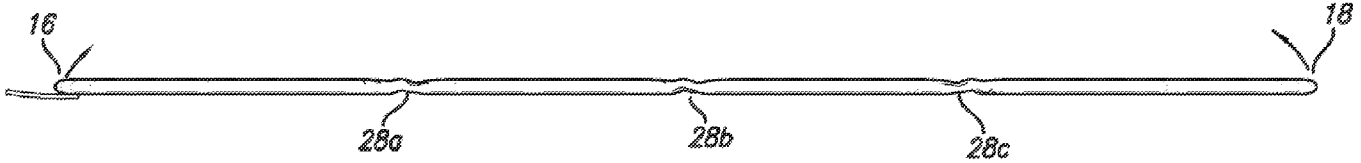
FIGS. 9A-9D show another set of folding steps for folding a protective collar into the form as shown in FIG. 6.
Figure 9C:
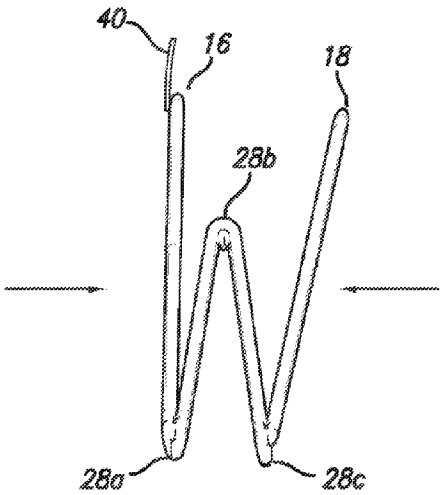
Figure 9B:
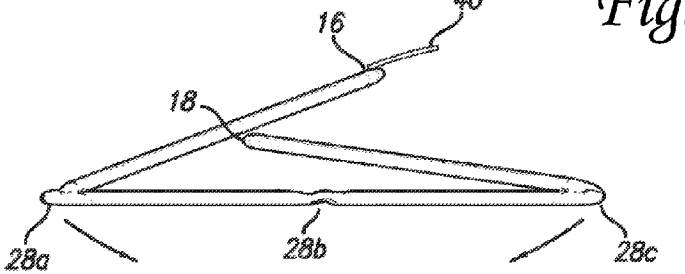
Figure 9D:
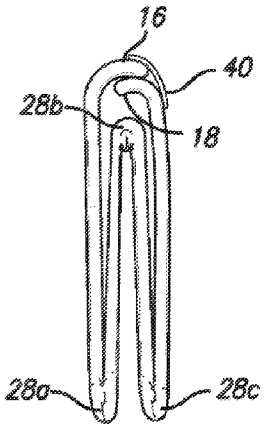

An additional feature of the invention lies in the ability to fold it into a small package for selling purposes or for the consumer to store it. One folding configuration is shown in FIGS. 7, 8A through 8D. This configuration is most suitable for smaller sizes with very easily flexed soft material such as the version described as illustrated in FIGS. 4 and 5. In this fold configuration the ends 60 and 62 meet and the fold points at 56a and 56b are together, the soft material being able to allow the fold points 56a and 56b to settle together. Another fold configuration is shown in FIGS. 6 and 9A through 9B. This configuration is most suitable for larger sizes with less easily flexed material such as the version described and illustrated in FIGS. 1 and 2. In this fold configuration ends 16 and 18 meet and are held together by the tabs 40 and 38 fastening to a mating strip 34 while the fold points 28a and 28b are separate and the fold point 28b is captured between close to the ends 16 and 18.

The collar is thus suitable for use in a method of protecting a wound from a surgical procedure, an injury that is non-surgical in nature, or to prevent mouth contact of an area to which a topical medicament has been applied.

When applied, it is known that some animals will use their teeth to try to dislodge the collar. This is where adhering the inside layer to the padding is particularly useful because it prevents the animal from finding or creating a fold by biting.

The present invention is directed toward a pet protective e-collar 10 having stays 150 disposed at seams 200 of the collar. In a variant, referring to FIGS. 12-17, the collar 10, is made of flexible material and is configured to fold at seams 200. The seams 200 form a channel 250 sized and shaped to retain flexible stays 150 between a channel side 280 and the collar 10. Optionally, the channel is disposed on an outside surface of one of the sheets of the layered assembly that forms the collar. Optionally, the channel may be formed between the sheets.

Figure 17:
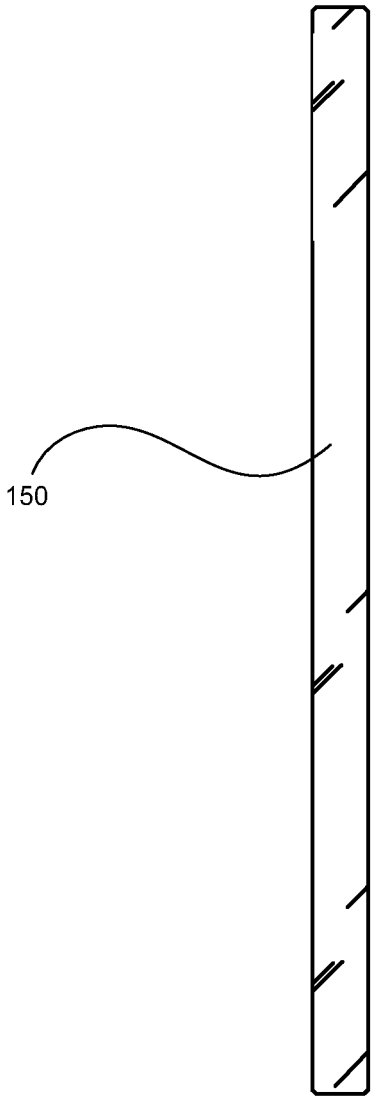
FIG. 17 is an illustration of a stay.

The stays 150, shown for example in FIG. 17, are more rigid than the material of the collar 10, are preferably somewhat bendable. For example, the material of the collar 10 may be made of nylon and the stays 150 may be made of bendable plastic. The stays, when connected to the collar have the effect of stiffening the overall shape of the collar and making it more difficult for the collar to be bent. Optionally, the stays are removable. Along the smaller circumference side 300 of the collar 10, the channels have openings 350 to the channels 250 that are securable with a mechanism 400, which in a preferred embodiment is hook and loop (Velcro) disposed inside the channel 250 near the opening 350 and completely across the opening.

In another variant, disposed in front of the opening is an optional piece of loop material 450 for partially occluding the opening 350 to assist in preventing unwanted escape of the stay 150 during use of the collar 10. Loops 500 are also attached to the collar 10 in front of the opening along the circumference 300 of the collar 10. The loops may also assist in preventing escape of the stays 150.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A protective collar effective as a veterinary restraint when fitted on an animal, the protective collar comprising:

a layered assembly comprising:

a first sheet comprising a flexible substantially non-resilient material having inner and outer arcuate edges extending between a first end and a second end of the first sheet, the inner and outer arcuate edges comprising single circular arcs, wherein the outer arcuate edge has a substantially greater radius than the inner edge;

a second sheet comprising a flexible substantially non-resilient material and having a substantially similar shape to that of the first sheet;

a flexible resilient padding layer, forming a generally similar shape to the first and second sheets located between said first and second sheets, such that when assembled the first and second sheets and the padding layer form the layered assembly having an outer arcuate edge and an inner arcuate edge and a first end and a second end;

at least one stay connected to one of the sheets, for preventing the sheet from folding, the stay being effective to stiffen the overall shape of the collar;

a plurality of channels each containing a stay, the channels at least partially extending between the inner arcuate edge and the outer arcuate edge of the layered assembly;

the first sheet and the second sheet and the padding layer between them being formed into the assembly by securing together the outer arcuate edges and the inner arcuate edges and the first and second ends of the first and second sheets;

a closure, effective to secure the first and second ends of the protective collar, such that when the first and second ends of the protective collar are secured, a closed configuration is formed having an inner opening and an outer opening, the inner opening being substantially smaller than the outer opening, wherein the outer opening is configured to encompass the wearer's head and the inner opening is configured to encompass a wearer's neck but not the head;

wherein the protective collar is sized and shaped to encompass both the wearer's head and neck on different parts of the restraint.

2. The protective collar of claim 1 further comprising:

a plurality of radial stitching lines at least partially extending between the inner arcuate edge and the outer arcuate edge of the layered assembly, operative to effectively segment the collar into panels, and such that the stitches are further effective as fold lines in order to easily fold the collar for packaging or storage;

*wherein* at least one [channel] *of the channels is* disposed along a radial stitching line, the *at least one* channel being configured to receive the stay.

3. The protective collar of claim [2] *1*, wherein the channels further comprise [an opening] *corresponding channel openings* disposed along the [smaller circumference side] *inner arcuate edge* of the [collar] *layered assembly*.

4. The protective collar of claim 3, wherein the channel openings to the channels having a closure mechanism.

5. The protective collar of claim 3, wherein the channel openings to the channels having a closure mechanism disposed inside the channel near the opening and completely across the opening.

6. The protective collar of claim 5, wherein the channels are formed on an outside surface of a sheet.

7. The protective collar of claim 5, wherein the channels are formed between the first and second sheet.

8. The protective collar of claim 3, wherein disposed in front of the opening is a piece of loop material for partially occluding the opening to assist in preventing unwanted escape of the stay during use of the collar.

[9. A protective collar effective as a veterinary restraint when fitted on an animal, the protective collar comprising:

a flexible assembly having an outer arcuate edge and an inner arcuate edge and a first end and a second end;

at least one stay connected to the assembly and extending in a direction between the inner and outer arcuate edges, the stay formed of a material stiffer than that of the flexible assembly;

a plurality of channels each containing a stay, the channels at least partially extending between the inner arcuate edge and the outer arcuate edge of the assembly.]

[10. The protective collar of claim 9, further comprising:

a plurality of radial stitching lines at least partially extending between the inner arcuate edge and the outer arcuate edge of the assembly, operative to effectively segment the collar into panels, and such that the stitches are further effective as fold lines in order to easily fold the collar for packaging or storage;

at least one channel disposed along a radial stitching line, the channel being configured to house the stay.]

11. [The protective collar of claim 10,] *A protective collar effective as a veterinary restraint when fitted on an animal, the protective collar comprising:*

*a flexible assembly having an outer arcuate edge and an inner arcuate edge and a first end and a second end;*

*at least one stay connected to the flexible assembly and extending in a direction between the inner and outer arcuate edges, the stay formed of a material stiffer than that of the flexible assembly;*

*a plurality of channels each containing a stay, the channels at least partially extending between the inner arcuate edge and the outer arcuate edge of the flexible assembly;*

*a plurality of radial stitching lines at least partially extending between the inner arcuate edge and the outer arcuate edge of the flexible assembly, operative to effectively segment the collar into panels, and such that the stitches are further effective as fold lines in order to easily fold the collar for packaging or storage;*

*at least one channel disposed along a radial stitching line, the channel being configured to house the stay;* wherein the channels further comprise [an opening] *respective openings* disposed along the [smaller circumference side] *inner arcuate edge* of the collar.

12. The protective collar of claim 11, wherein the channel openings to the channels having a closure mechanism.

13. The protective collar of claim 12, wherein the [channel openings to the channels having a] closure mechanism *is* disposed inside the channel near the opening and completely across the opening.

14. The protective collar of claim 12, wherein disposed in front of the opening is [a] *an* optional piece of loop material for partially occluding the opening to assist in preventing unwanted escape of the stay during use of the collar.

15. The protective collar of claim 14, wherein the channels are formed on an outside surface of a sheet.

16. The protective collar of claim 14, wherein the channels are formed between the first and second [sheet] *sheets*.

[17. A protective collar effective as a veterinary restraint when fitted on an animal, the protective collar comprising:

a layered assembly comprising:

a first sheet comprising a flexible substantially non-resilient material having inner and outer arcuate edges extending between a first and second end of the first sheet, the inner and outer arcuate edges comprising circular arcs, wherein the outer arcuate edge has a substantially greater radius than the inner edge;

a second sheet comprising a flexible substantially non-resilient material and having a substantially similar shape to that of the first sheet;

wherein when assembled, the first and second sheets form the layered assembly having an outer arcuate edge and an inner arcuate edge and a first end and a second end;

at least one stay connected to the assembly and extending in a direction between the inner and outer arcuate edges, the stay formed of a material stiffer than that of the flexible assembly;

a plurality of channels each containing a stay, the channels at least partially extending between the inner arcuate edge and the outer arcuate edge of the assembly;

the first sheet and the second sheet formed into the assembly by securing together the outer arcuate edges and the inner arcuate edges and the first and second ends of the first and second sheets;

a closure, effective to secure the first and second ends of the protective collar, such that when the first and second ends of the protective collar are secured a closed configuration is formed having an inner opening and an outer opening, the inner opening being smaller than the outer opening to provide a truncated cone shape.]

*18. A protective collar effective as a veterinary restraint when fitted on an animal, the protective collar comprising:*

*a layered assembly comprising:*

*a first sheet and a second sheet;*

*at least one stay connected to one of the sheets, for preventing the sheet from bending back on itself, the stay being effective to stiffen the overall shape of the collar;*

*at least one channel containing the at least one stay, the channel at least partially extending between inner and outer edges of the layered assembly, the channel being configured to receive the stay; and*

*a closure, effective to secure first and second ends of the protective collar;*

*wherein the at least one stay is removable from at the least one channel further comprising an opening.*

*19. The protective collar of claim 18, wherein the opening has an occluding mechanism.*

*20. The protective collar of claim 18, wherein the opening has an occluding mechanism disposed inside the channel near the opening and completely across the opening.*

*21. The protective collar of claim 20, wherein the at least one channel is formed on an outside surface of a sheet.*

*22. The protective collar of claim 20, wherein the at least one channel is formed between the first and second sheet.*

*23. The protective collar of claim 18, wherein disposed in front of the opening is a piece of loop material for partially occluding the opening to assist in preventing unwanted escape of the stay during use of the collar.*

*24. The protective collar of claim 18, further comprising at least one radial stitching line at least partially extending between the inner edge and the outer edge of the layered assembly, operative to effectively segment the collar into panels, and such that the at least one stitching line is further effective as at least one fold line in order to easily fold the collar for packaging or storage.*

*25. The protective collar of claim 18, wherein the opening is disposed along the inner edge of the layered assembly.*

*26. A protective collar effective as a veterinary restraint when fitted on an animal, the protective collar comprising:*

*a flexible assembly having an outer arcuate edge and an inner arcuate edge and a first end and a second end;*

*at least one stay connected to the assembly and extending in a direction between the inner and outer arcuate edges, for preventing the flexible assembly from folding, the stay formed of a material stiffer than that of the flexible assembly; and*

*at least one channel containing a stay, the channel at least partially extending between the inner arcuate edge and the outer arcuate edge of the assembly;*

*wherein the at least one stay is removable from at the least one channel further comprising an opening.*

*27. The protective collar of claim 26, wherein the opening has an occluding mechanism.*

*28. The protective collar of claim 27, wherein the occluding mechanism disposed is inside the channel near the opening and completely across the opening.*

*29. The protective collar of claim 27, wherein disposed in front of the opening is an optional piece of loop material for partially occluding the opening to assist in preventing unwanted escape of the stay during use of the collar.*

*30. The protective collar of claim 29, wherein the at least one channel is formed on an outside surface of a sheet.*

*31. The protective collar of claim 29, wherein the channel is formed between the first and second sheet.*

*32. The protective collar of claim 26, further comprising at least one radial stitching line at least partially extending between the inner arcuate edge and the outer arcuate edge of the assembly, operative to effectively segment the collar into panels, and such that the at least one radial stitching line is further effective as at least one fold line in order to easily fold the collar for packaging or storage; and*

*at least one channel disposed along the at least one radial stitching line, the channel being configured to house the stay.*

*33. The protective collar of claim 26, wherein the opening is disposed along the inner arcuate edge.*

* * * * *